(12) United States Patent
Benner, Jr.

(10) Patent No.: US 11,162,819 B2
(45) Date of Patent: Nov. 2, 2021

(54) LOW INERTIA ROTARY POSITION DETECTOR AND ASSOCIATED METHODS

(71) Applicant: William R. Benner, Jr., Sorrento, FL (US)

(72) Inventor: William R. Benner, Jr., Sorrento, FL (US)

(*) Notice: Subject to any disclaimer, the term of this patent is extended or adjusted under 35 U.S.C. 154(b) by 91 days.

(21) Appl. No.: 16/635,659

(22) PCT Filed: Jul. 31, 2018

(86) PCT No.: PCT/US2018/044624
§ 371 (c)(1),
(2) Date: Jan. 31, 2020

(87) PCT Pub. No.: WO2019/028038
PCT Pub. Date: Feb. 7, 2019

(65) Prior Publication Data
US 2020/0363239 A1    Nov. 19, 2020

Related U.S. Application Data

(60) Provisional application No. 62/539,257, filed on Jul. 31, 2017.

(51) Int. Cl.
*G01D 5/34* (2006.01)
(52) U.S. Cl.
CPC .................................. *G01D 5/342* (2013.01)
(58) Field of Classification Search
USPC .................................................... 250/231.18
See application file for complete search history.

(56) References Cited

U.S. PATENT DOCUMENTS

| 8,809,763 B1 | 8/2014 | Stutz |
| 2004/0227065 A1 | 11/2004 | Thorburn |
| 2006/0118707 A1* | 6/2006 | Schaake ............. G01D 5/34715 250/231.13 |

(Continued)

FOREIGN PATENT DOCUMENTS

WO    2010130801 A1    11/2010

OTHER PUBLICATIONS

International Search Report dated Oct. 17, 2018 for PCT/US18/44624.

*Primary Examiner* — Georgia Y Epps
*Assistant Examiner* — Kevin Wyatt
(74) *Attorney, Agent, or Firm* — Greenberg Traurig, P.A.; Stephen G. Anderson

(57) ABSTRACT

A rotary position detector includes a housing having an inner space having a reflective element. A light source emits light rays into the inner space. A base supports a light detector assembly having a first number of toroidal-sector-shaped light sensors arranged circumferentially about a motor shaft axis, is, one "Cosine +" detector element, one "Cosine –" detector element, one "Sine +" detector element, and one "Sine –" detector element. A light blocker positioned between the light source and the light sensors rotates with the shaft. The light blocker includes a second number of opaque, equal-surface-area elements arrayed about the axis, the second number equal to one-half the first number. A circuit measures a signal from the detectors relating to an amount of light falling thereon, a difference related to an angular position of the motor shaft.

21 Claims, 15 Drawing Sheets

(56) References Cited

U.S. PATENT DOCUMENTS

2011/0101209 A1    5/2011  Benner, Jr.
2016/0084677 A1*   3/2016  Petschik ................. G01D 5/34
                                                    250/231.13

* cited by examiner

LOW INERTIA ROTARY POSITION DETECTOR AND ASSOCIATED METHODS

CROSS REFERENCE TO RELATED APPLICATION

This application claims the benefit of, and priority to, U.S. Provisional Patent Application Ser. No. 62/539,257, filed Jul. 31, 2017, the entirety of which is incorporated by reference and commonly owned.

FIELD OF THE INVENTION

The embodiments disclosed herein relate to rotary position detectors for indicating the angular position of a shaft or other rotating element.

BACKGROUND

Rotary position detectors have many uses, such as detecting the position of the shaft on a motor, for the purpose of electrical commutation. Another such use is to detect the position of a knob that a user rotates to adjust volume, tuning or some other parameter.

Brushless motors are devices that have fixed coils and rotating armatures, but do not have any built-in commutation systems. Instead, these motors rely on outboard circuitry to apply current to their coils in sequence, at the right time. To aid in the timing of the application of current to the coils, brushless motors may use encoders or resolvers that are attached to the motor shaft and serve as "rotary position detectors".

Ideally, a rotary position detector should provide high accuracy and good repeatability. Moreover, ideally the rotary position detector should not place any undue burden on the motor in the form of additional inertia.

An additional desirable property of a rotary position detector is that the signal-to-noise ratio should be as high as possible.

There are several ways to sense the rotary position of the shaft of a motor. The most popular two types comprise digital rotary encoders and electro-magnetic resolvers.

Digital rotary encoders are available in two types— "incremental" and "absolute". Incremental encoders are the simplest, and typically use only two photo-sensors, providing a "quadrature" output pulse train. These encoders provide pulse output for incremental shaft rotations. For example, an incremental encoder may produce 4096 pulses per complete shaft revolution. These encoders may include an "index" pulse to help the overall system know the absolute position of the rotor. In any event, when power is applied to a system that uses an incremental encoder, the system must exercise the motor shaft and find the index pulse before the actual position of the motor shaft is known.

Absolute encoders typically have more than two photo-sensors, which can decode information on the encoder wheel into an absolute position. In any event, when power is applied to a system that employs absolute encoders, the absolute position of the motor shaft will be known, even without any exercising or additional shaft motion being performed. This is a benefit of absolute encoders. However, because of the complexity of additional photo-sensors and the encoder wheel, absolute encoders generally do not offer as high of resolution when compared with incremental encoders of similar size. Moreover, due to the increased complexity, absolute encoders are more expensive than incremental encoders.

Encoders offer the ability to be directly connected to microprocessor-based systems. However, typically the rotational resolution is limited. For example, the highest resolution presently available from Encoder Manufacturer US Digital is 10,000 counts per revolution, in a 2 inch round disk. For motors that require higher resolution, or motors that cannot tolerate the inertia or dimensions that a 2 inch round disk requires, these encoders would not be a good solution.

Another way to sense motor shaft rotation is to use a resolver. This is an electro-magnetic device in which a sine and cosine signal is produced by the relative motion of the rotor and stator of the resolver. Resolvers offer absolute rotary position accuracy and high rotational resolution. However, since resolvers involve the use of steel stator and rotor components, the inertia is relatively high. Moreover, when the rotary position must be known by a microprocessor-based system, the resolver signals must be sent to a Resolver-To-Digital converter. This adds additional cost and complexity.

Yet another way to sense motor shaft rotation is to use a magnet attached to the motor shaft and a pair of hall-effect sensors. There are also dedicated encoder ASIC chips that have integrated hall sensors and can deliver an absolute position to a microprocessor system. The drawback to these systems is the inertia of the magnet that must be added to the motor shaft, and the relatively limited resolution that can be attained, even with integrated hall sensor ASIC chips.

Since the inertia of resolvers and even hall-effect encoder solutions is many times the rotor inertia of a small brushless motor with rotor inertia of 0.050 GM*$CM^2$ or less, it means that resolvers and hall-effect encoder solutions are not a good option. Moreover, even digital encoders mentioned above have very high inertia when compared with very-low-inertia brushless motors.

Alternative Rotary Position Detectors that use optical techniques have been used on Galvanometer-based optical scanners (sometimes called "galvos"). These galvos are specialized motors that typically do have low rotor inertias in the range mentioned above. The rotary position detectors used on galvos include those found in U.S. Pat. No. 7,688,432 as well as U.S. Pat. Nos. 7,940,380 and 8,508,726. These rotary position detectors offer the compact size, high resolution, low cost and low inertia that would be desirable for use with low-inertia brushless motors and other continuous rotation applications. Unfortunately these prior-art sensors can only be used over a limited rotation angle— typically 50 degrees or less.

There are not any solutions for applications that require the ability to sense rotation angle over the entire 360-degree angular range, and that also offer high resolution, compact size, low cost and low inertia.

SUMMARY

The current invention is directed to a low inertia optical position detector, with the ability to detect motion over 360 degrees with high resolution, and can be used with small motors that have low inertia. Moreover, embodiments of the invention provide high signal-to-noise ratio as well as absolute position accuracy.

A rotary position detector is provided herein that may comprise a housing having an inner space defined by an inner wall. A light source is positioned to emit light rays into the housing's inner space from a position opposite of a motor shaft. A base is positioned within the housing's inner space.

A light detector assembly is positioned within the housing's inner space and comprises four light sensors positioned on the base and arranged circumferentially about an axis of a motor shaft. The light sensors comprise one "Cosine +" detector element, one "Cosine −" detector element, one "Sine +" detector element, and one "Sine −" detector element. The term "light sensor" herein is intended to connote a region of light-sensitive material.

A light blocker is affixed within the housing's inner space for rotation with the motor shaft between the light source and the light detector assembly. The light blocker may comprise a single opaque element positioned about the motor shaft axis. Thus the light rays emanating from the light source that not blocked by the light blocker will reach light detector assembly, and light rays that are blocked by the light blocker are not received by the light detector assembly.

A signal connection is provided between the light detector elements and a circuit for measuring a signal from the "Cosine +", "Cosine −", "Sine +" and "Sine −" detectors relating to an amount of light falling thereon. A mathematical relationship relates the signals from each light detector, and provide an indication of the absolute angular position of the motor shaft.

BRIEF DESCRIPTION OF THE DRAWINGS

Features characterizing embodiments of the invention, both as to organization and method of operation, together with further objects and advantages thereof, will be better understood from the following description used in conjunction with the accompanying drawings. It is to be expressly understood that the drawings are for the purpose of illustration and description and are not intended as a definition of the limits of the invention. These and other objects attained, and advantages offered, by the present invention will become more fully apparent as the description that now follows is read in conjunction with the accompanying drawings in which.

DETAILED DESCRIPTION OF EMBODIMENTS

Figure 1:
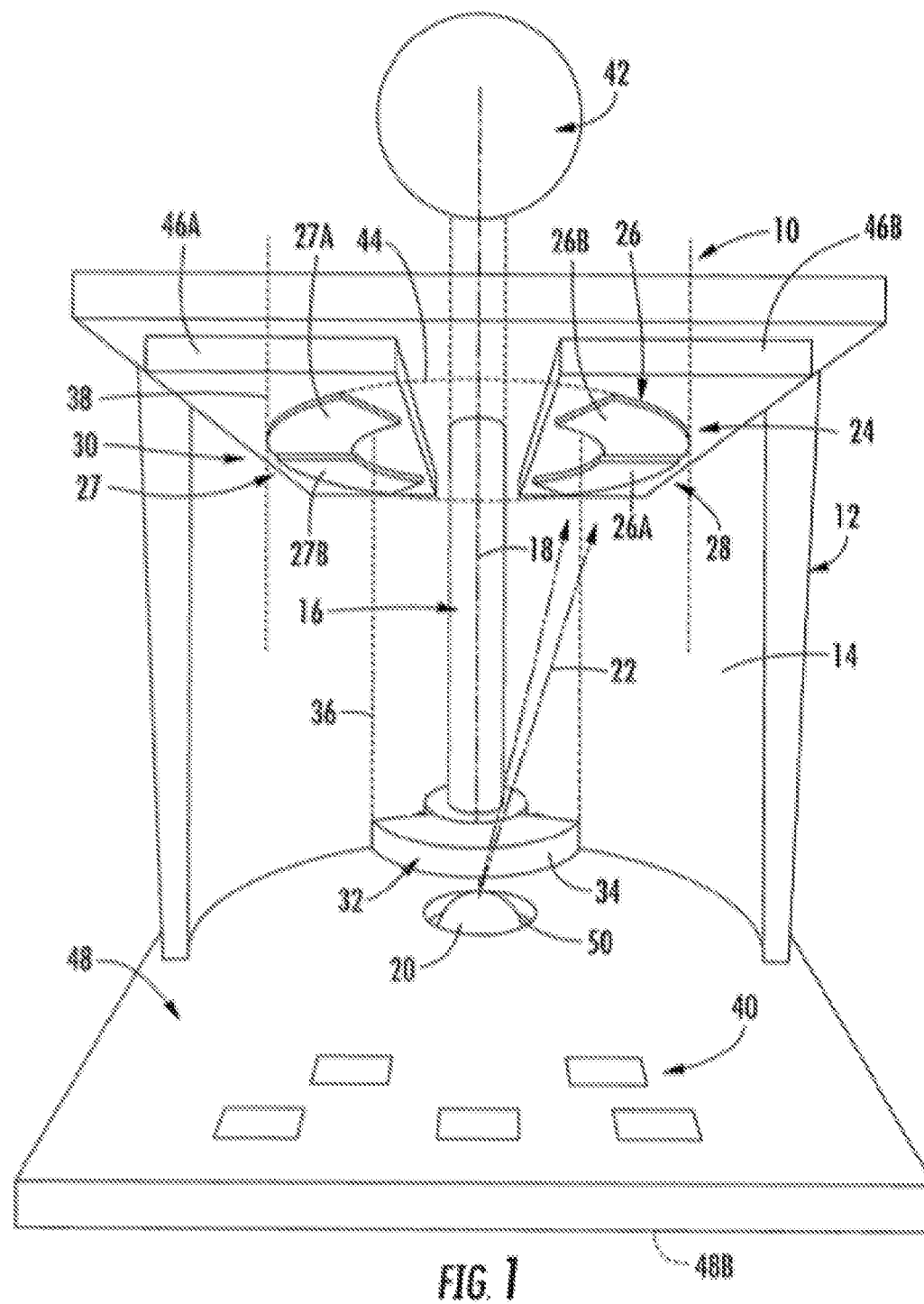
FIG. 1 is a side perspective view of one embodiment of an optical position detector of the current invention, with the housing illustrated in cut-away view.

The present invention will now be described more fully hereinafter with reference to the accompanying drawings, in which embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, or other references mentioned herein are incorporated by reference in their entirety. In case of conflict, the present specification, including any definitions, will control. In addition, the materials, methods, and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description.

Embodiments of the invention are herein initially described with reference to FIGS. 1 and 2, which depict a rotary position detector 10 and an alternate embodiment of the detector 10A, wherein each may comprise a housing 12 having an inner space 14. A shaft 16, rotatable about an axis 18 extends into the housing inner space 14. A light source 20 is positioned to emit light rays 22 into the housing inner space 14. A light detector 24 is positioned within the housing inner space 14 in a spaced relation to the light source 22. The light detector 24 comprises four segmented light sensor elements 26A (SIN-), 26B (COS-), 27A (SIN+), 27B (COS+) arranged circumferentially about the axis 18. The COS+ 27B sensor element and COS- 26B detector element generates signals related to the Cosine output of the position sensor. The SIN+ 27A detector element and SIN- 26A detector element generates signals related to the Sine output of the position sensor. Each COS element 26B, 27B is circumferentially positioned between two SIN detector elements 26A, 27A and vice versa. A light blocker 32 is positioned between the light detector 24 and the light source 20. The light blocker 32 comprises a single opaque light blocker element 34 rotatable with the shaft 16. The light blocker 32 blocks at least a portion of the light rays 22 from reaching the light detector 24. As will be further described later in this section, a signal connection 40 to the light detector 24 is provided for measuring an amount of light impinging on the segmented light sensor elements 26A, 26B, 27A, 27B to thus measure a rotary position of the shaft 16.

Figure 2:
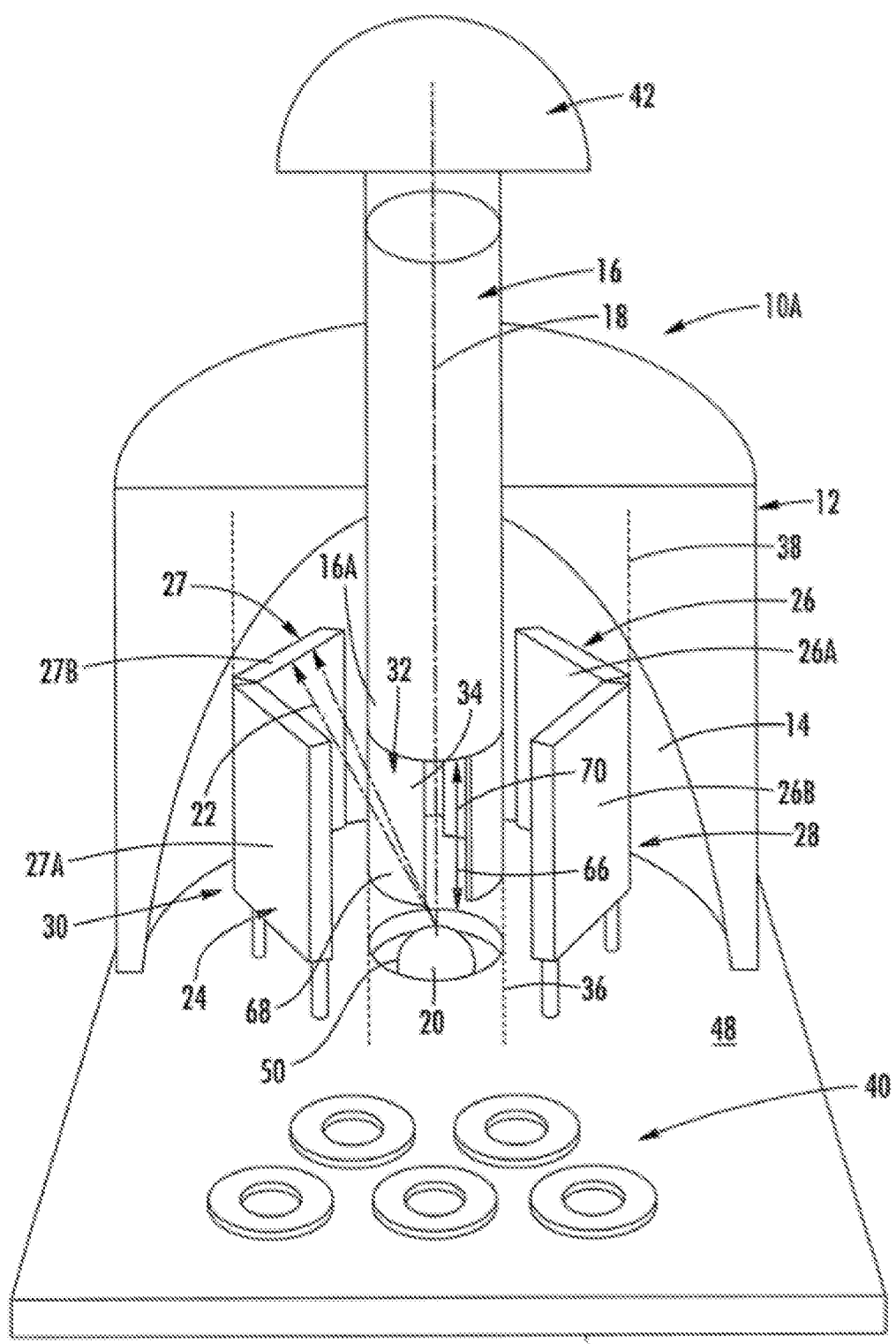
FIG. 2 is a side perspective view of another embodiment of the optical position detector of the current invention wherein the light blocker is formed by a bottom end of the motor shaft, and the light sensors are rectangular, with the housing illustrated in cut-away view.

The embodiment herein described, by way of example, with continued reference to FIGS. 1 and 2, is described in the context of its use within a motor, although this is not intended as a limitation. The housing 12 is adapted to house the sensor components and to absorb unwanted light rays from the environment, and also to connect the shaft 16 directly or indirectly to a motor 42 in a particular embodiment. The housing 12 may comprise, for example, injection-molded plastic or machined metal, although this is not intended as a limitation.

The light source 20 produces a field of light, directing the light rays 22 toward the plurality of light sensors, as illustrated with reference to the detector 10 of FIGS. 1 and 10A of FIG. 2. The light sensor elements 26A, 26B, 27A, 27B can be manufactured on light detector chips 46A, 46B, as illustrated with reference to FIG. 1, or may be separated and mounted on a circuit board 48, as illustrated with reference to FIG. 2. The light detector 24 is positioned on the same side of the motor 42 as is the light source 20, but spaced apart from the light source, wherein the light blocker 32 is located between the light source and the light sensor elements 26A, 26B, 27A, 27B.

Note that unlike prior-art sensors, there are no firm requirements on the uniformity of the field of light produced by the light source 20. This is because it is expected that the output of this invention 10, 10A will be further conditioned and linearized when necessary. Therefore as long as the light source 20 produces light rays 22 which are able to be received by all light sensor elements 26A, 26B, 27A, 27B, this is sufficient for proper operation.

Figure 11:
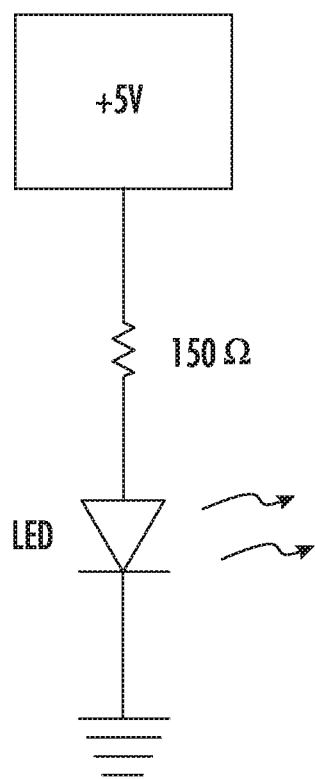
FIG. 11 illustrates one embodiment of a simple circuit capable of providing current to an LED, which may be used as a light source in the current invention.

Also note that unlike prior-art sensors, there is no firm requirement that the light source 20 produce the same amount of light over time and regardless of temperature variations. This is because the final angular output from this invention is related to the proportionality of the light received by the light sensor elements 26A, 26B, 27A, 27B, and not based on the absolute magnitude of the light. For a given angle, the proportionality of the light received by light sensor elements 26A, 26B, 27A, 27B will be the same, regardless of the amount of light produced by the light source 20. Because of this, an AGC system is not needed, and a very simple circuit can be used to power the light source 20, such as the circuit shown in FIG. 11.

As herein described by way of example for the detector 10 with reference to FIG. 1, the light blocker 32 comprises a single element 34 formed as a generally pie-shaped protrusion, that periodically interrupts the light rays 22 from reaching certain areas of the light sensor elements 26A, 26B, 27A, 27B, by casting a shadow over the sensors.

Moreover, unlike prior art rotary position detectors, there is no restriction of the radial extent of the light blocker element. The radial extent of the light blocker element may be less than the radial extent of the light sensor elements 26A, 26B, 27A, 27B, as shown in FIG. 1, or the radial extent may be as great or even greater than that of the outer-most portion of the light sensor elements, as shown in FIGS. 3A, 3B, 4A, 4B, 8A, and 8B. This invention will work as long as the light blocker is capable of periodically blocking at least a portion of the light impinging on each light sensor element, 26A, 26B, 27A, 27B.

The light blocker 32 herein described by way of example is operably connected to the shaft 16. The rotation of the shaft 16, driven by the motor 42, causes the light blocker 32 to rotate. As the illumination areas of some light sensor elements 26A, 26B, 27A, 27B increase (when less of the light sensor area is under a shadow), an output signal from the light sensors also increases. Simultaneously, as the illuminated areas of other light sensor elements 26A, 26B, 27A, 27B decrease (when more of the light sensor area is under a shadow), the output signal from these light sensors decrease.

With continued reference to FIGS. 1 and 2, the light source 20 preferably comprises a unitary LED, mounted on the circuit board 48 or other suitable surface attached to housing 12. For the embodiments herein described, by way of example, the LED is mounted on a bottom side 48B of the circuit board 48, and the light rays 22 emitted from the light source 20 are directed through a hole 50 in circuit board. Such a structure is desirable because any light that is emanating in a sideways fashion will be terminated by walls forming the hole in the circuit board 48 and will not be able to shine indirectly onto the light sensor elements 26A, 26B, 27A, 27B. However, other embodiments are also possible as long as the light source 20 is suitable and located generally along the axis 18 and below the shaft 16, as illustrated with continued reference to FIGS. 1 and 2. The light rays 22 are projected from the light source 20 toward the light sensor elements 26A, 26B, 27A, 27B.

Although the light source 20 has been described as an LED, the light source may also be embodied as a phosphorescent dot, or any other source that produces a suitable cone of light including the light rays 22 in the direction needed. Note that the light source 20 may be provided by a fiber 52, wherein the light source may be located remotely, for example, on a servo driver board, and fed to the detector the optical fiber. This may be preferable in military applications where the detector has to work at elevated temperatures that would be prohibitive for an LED operation. Also, when fed by the fiber, a laser can be used as the light generating means for the light source.

With continued reference to FIG. 1 and now to FIGS. 3A, 3B, 4A, 4B, 8A, and 8B, there are four light sensor elements 26A, 26B, 27A, 27B as herein described, by way of example, and toroidal-sector-shaped, and as described herein arranged about the axis 18. As herein described by way of example, the light blocker 32 comprises a single opaque element 34, positioned about the axis 10.

Figure 9:
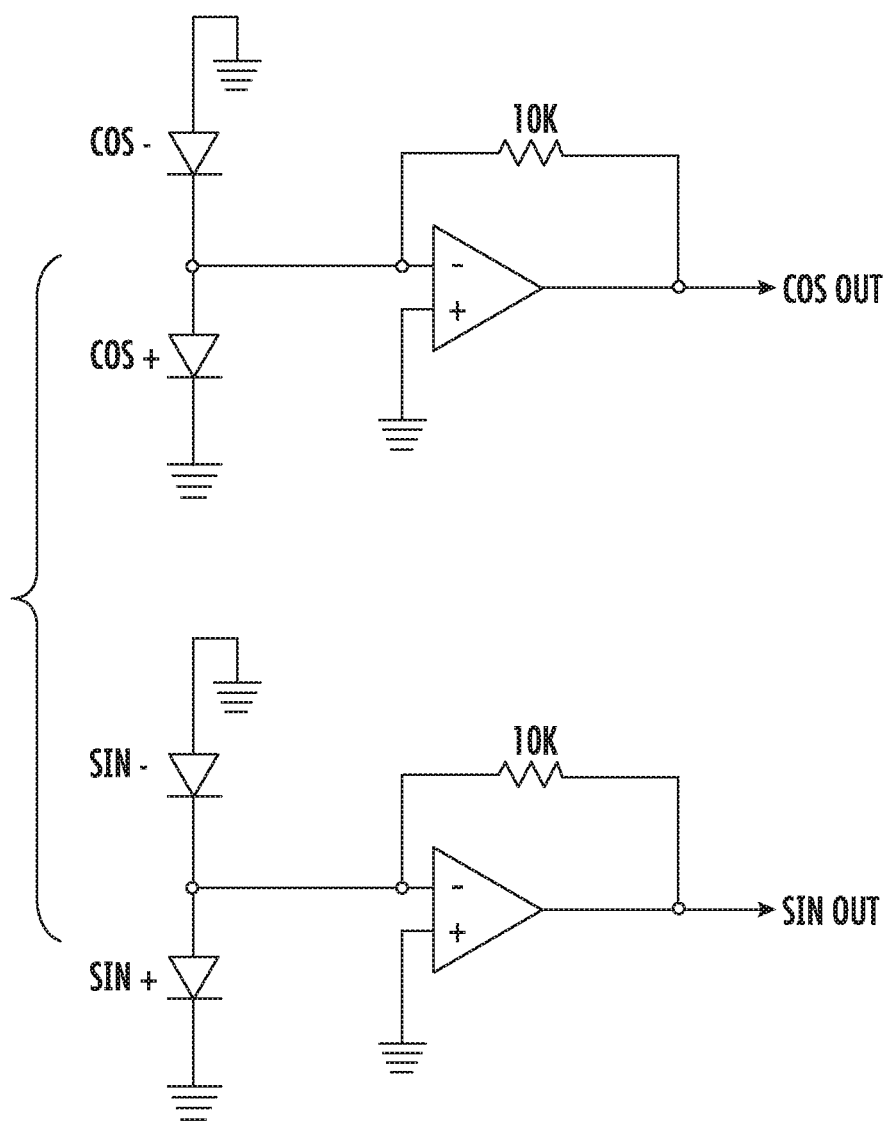
FIG. 9 illustrates an embodiment of light sensor element connectivity to provide output signals, wherein diametrically opposed light sensor elements are connected anode-to-cathode, and then amplified to provide Cosine and Sine outputs.
Figure 10:
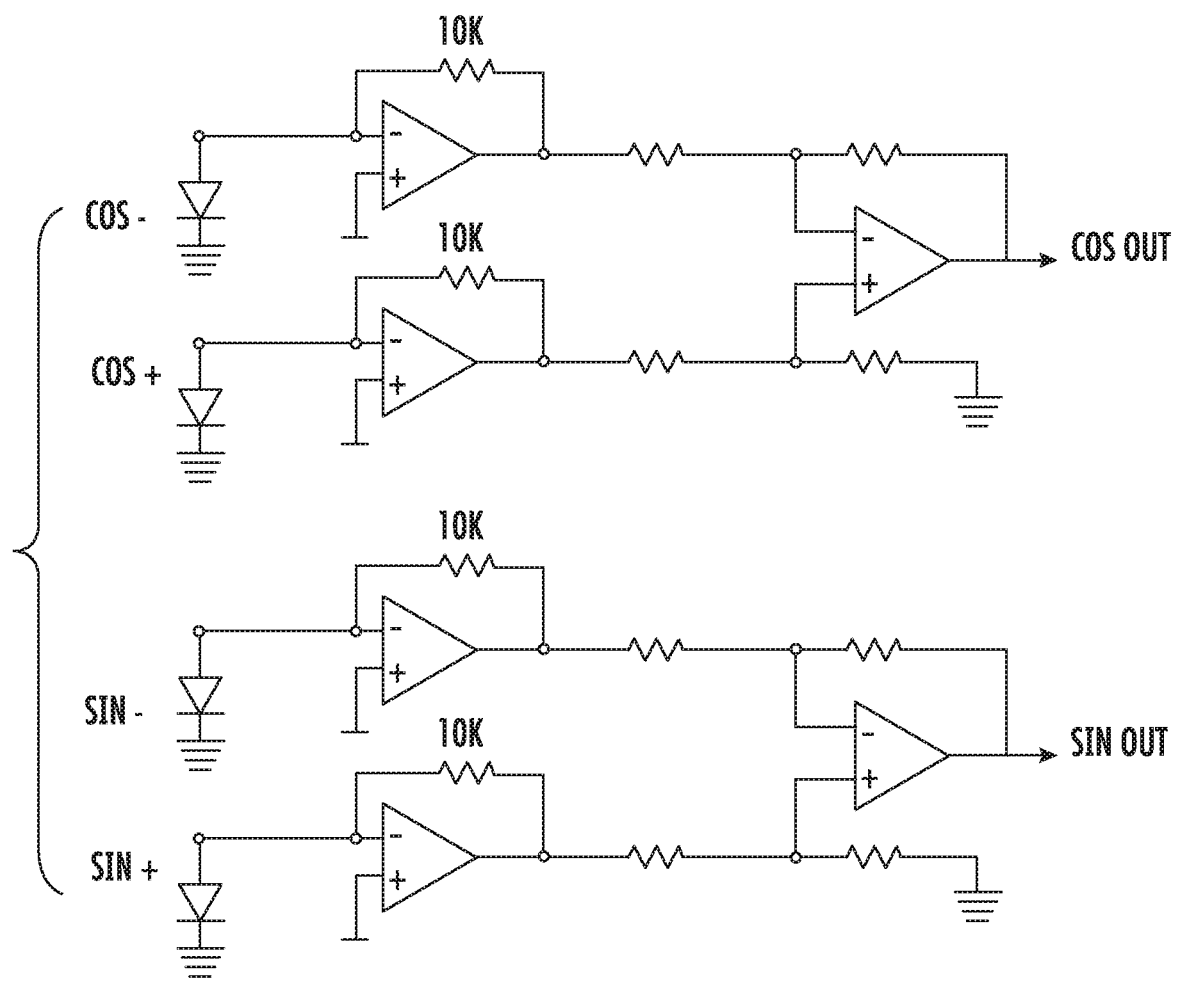
FIG. 10 illustrates another embodiment of light sensor element connectivity to provide output signals, wherein each diametrically opposed light sensor element is connected to an amplifier, and then combined and amplified by a separate amplifier to provide Cosine and Sine outputs.

In order for the position detector invention 10, 10A to produce output which is ultimately decoded into an absolute angle, the signal connection 40 in one embodiment may be directed to a circuit that combines the signals produced by the SIN− 26A and SIN+ 27A into a single Sine output, and that also combines the COS− 26B and COS+ 27B signals into a Cosine output, which are then interpreted by an Arctangent function to decode the actual angle of the position detector invention. Circuits that combine the SIN− 26A, SIN+ 27A, COS− 26B and COS+ 27B are shown in FIGS. 9 and 10.

As illustrated with reference to FIG. 3A, the light blocker 32 is entirely uncovering the SIN− 26A, COS+ 27B and SIN+ 27A toroidal light sensor elements, but entirely covering COS− 26B toroidal light sensor element, as illustrated by the darkened area which represents the light blocker element 34. In this embodiment, an angular subtense of the light blocker element 34 (here approximately 90 degrees) may be approximately the same as the angular subtense of the light sensor elements 26A, 26B, 27A, 27B (also approximately 90 degrees).

Figure 3A:
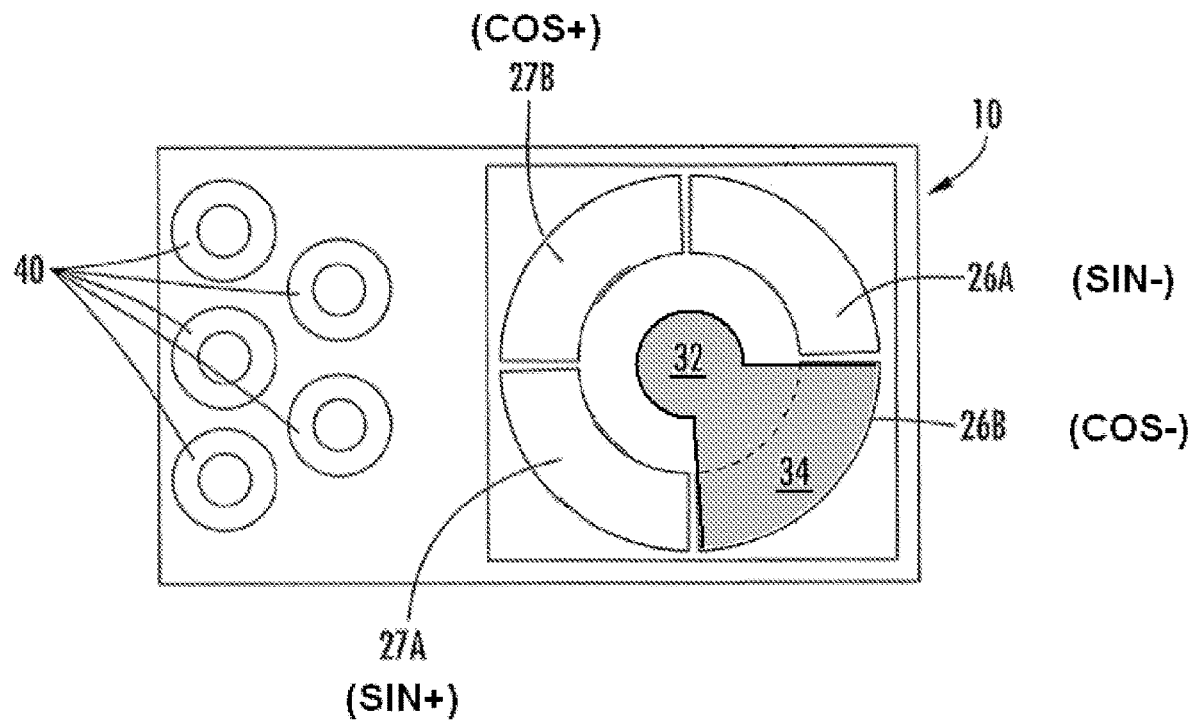
FIG. 3A is a top plan view of one embodiment of the position sensor of the current invention, including the circuit board, toroidal-shaped light sensors, and one possible embodiment of a wedge-shaped light blocker in the 0-degree position.
Figure 12:
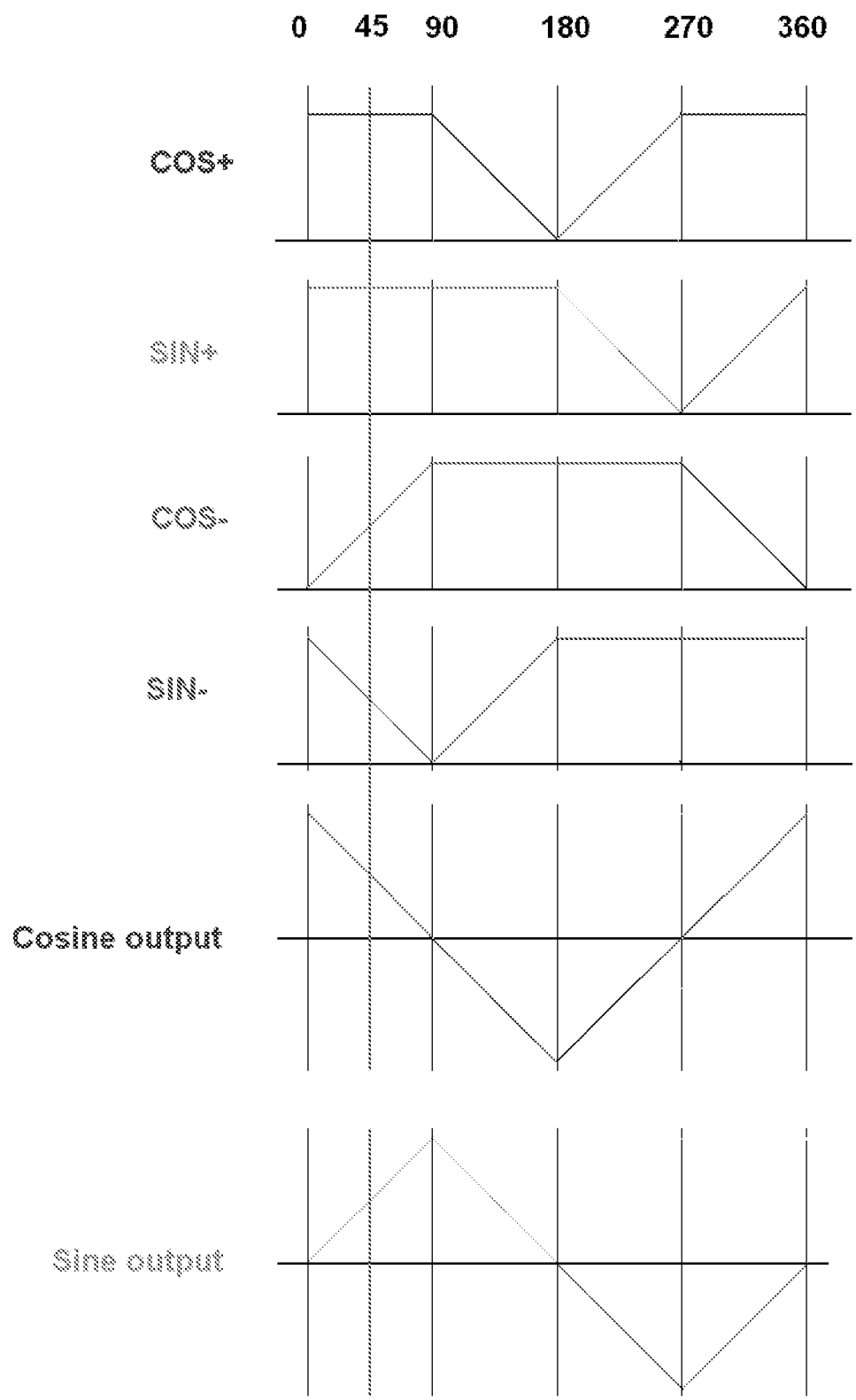
FIG. 12 illustrates the output of each of the COS+, SIN+, COS− and SIN− light sensors and combined Cosine and Sine outputs when light blockers are used that block light over an approximately 90-degree angle.

In the position shown in FIG. 3A, the light emanating from the light source 20 will be allowed to fall unhindered on the SIN− 26A, COS+ 27B, and SIN+ 27A light sensor elements, thus allowing each of these light sensor elements to produce maximum output signal. In this position, the output produced by each separate light sensor element 26A, 26B, 27A, 27B as well as the combined Sine and Cosine outputs will be equivalent to that shown at the 0-degree position of FIG. 12. Since both the SIN− 26A and SIN+ 27A light detector elements are completely uncovered, they are receiving light from the light source 20, and will both produce an equal-but-opposite output signal. In this case the output signal from these light sensor elements 26A, 27A cancel each other out, and the circuit shown in FIGS. 9 and 10 will output zero volts at the Sine output. However, since the COS+ 27B light sensor element is completely uncovered (causing it to produce a maximum output signal), but the COS− 26B light sensor element is completely covered (causing it to produce no output signal), the circuit shown in FIGS. 9 and 10 will produce the maximum positive output at the Cosine output.

Figure 3B:
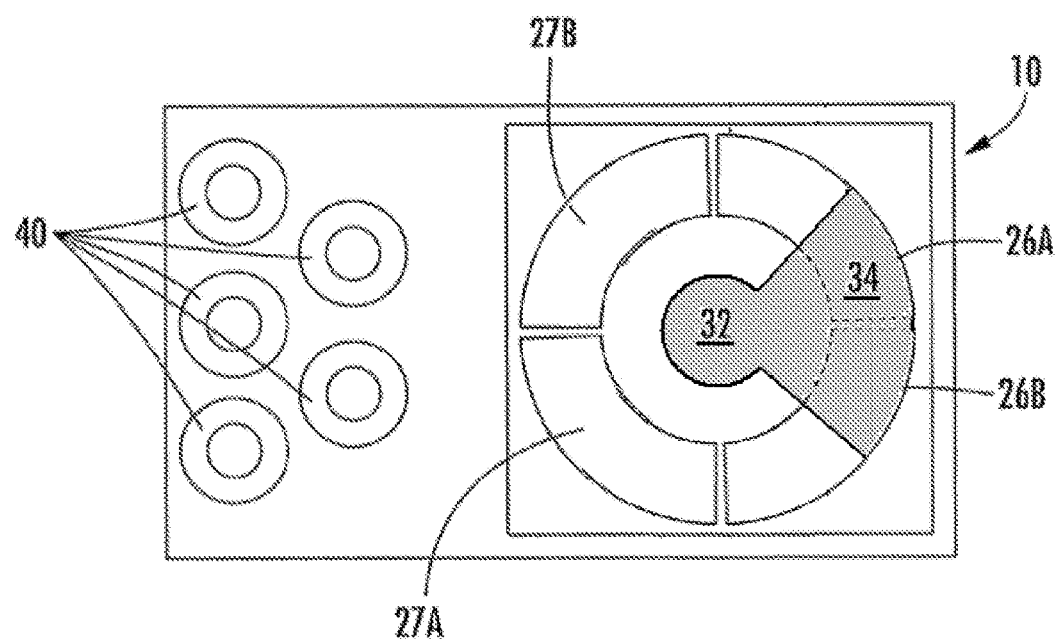
FIG. 3B is a top plan view of one embodiment of the position sensor of the current invention, including the circuit board, toroidal-shaped light sensors, and one possible embodiment of a wedge-shaped light blocker in the 45-degree position.

The drawing of FIG. 3B is similar to FIG. 3A, except that the light blocker 32 has been rotated by 45 degrees. In this position, the light emanating from the light source 20 will be allowed to fall unhindered on the SIN+ 27A and COS+ 27B light sensor elements, causing each of them to produce maximum output signal. But since the SIN− 26A and COS− 26B light sensor elements are approximately 50% covered, these light sensor elements will only produce 50% signal output. In this position, the output will be equivalent to that shown at the 45-degree position of FIG. 12. It is clear that the Cosine output has now fallen to 50% and the Sine output has risen to 50% at this rotational position.

As the light blocker 32 continues to rotate counter-clockwise, it will continue to periodically cover and uncover light sensor elements 26A, 26B, 27A, 27B which, in turn, affects how the output signal from the light sensor elements changes over time, and may be combined into Sine and Cosine outputs, and ultimately decoded into an absolute angular position.

When the angular subtense of the light blocker element 34 is roughly equivalent to that of individual light sensor elements, an pseudo triangle-wave output signal is produced by each one of the light sensor elements, and an approximately triangle-wave output is produced as the combined Sine and Cosine outputs. However, other angular subtenses are also possible for the light blocker element.

Figure 4A:
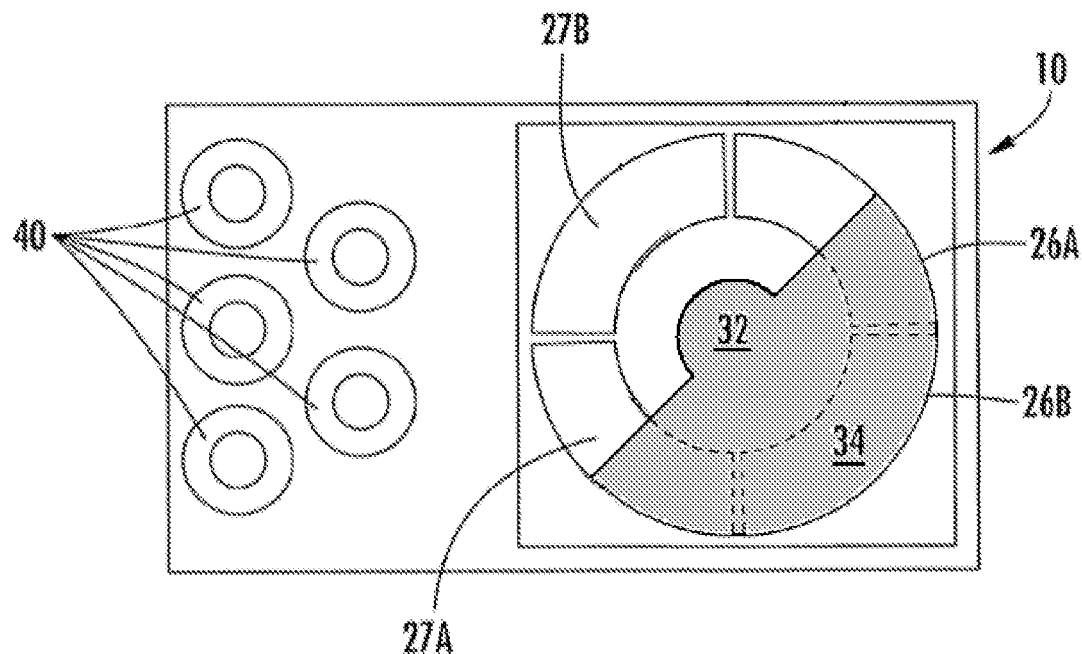
FIG. 4A is a top plan view of another embodiment of the position sensor of the current invention, including the circuit board, toroidal-shaped light sensors, and one possible embodiment of a half-circle-shaped light blocker in the 0-degree position.
Figure 4B:
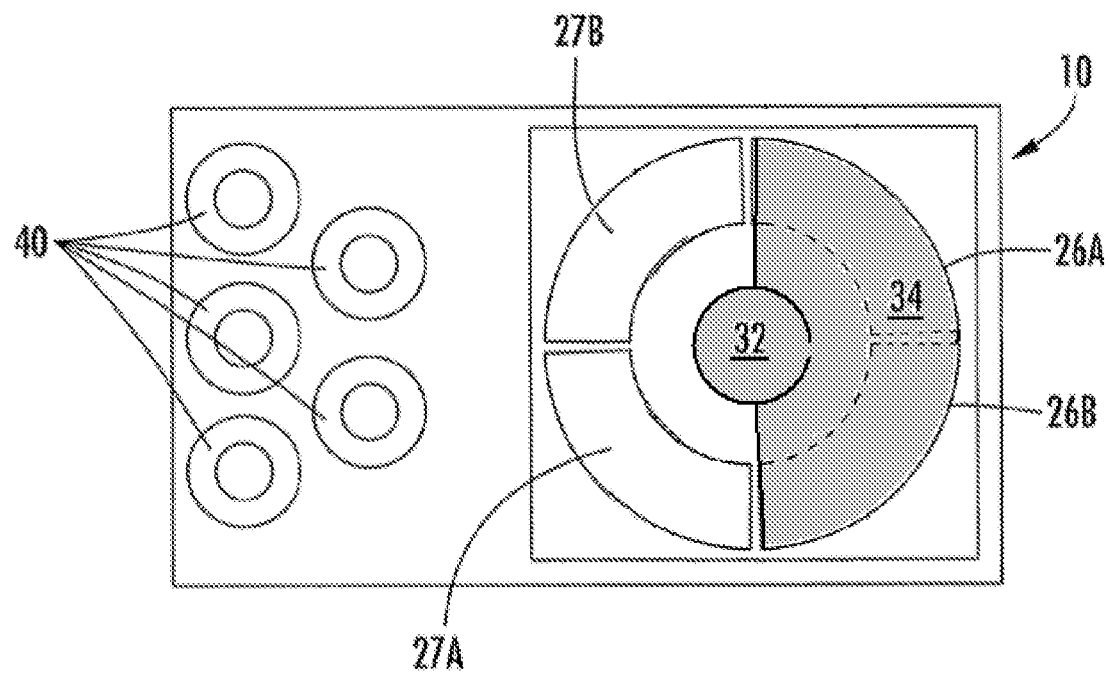
FIG. 4B is a top plan view of another embodiment of the position sensor of the current invention, including the circuit board, toroidal-shaped light sensors, and one possible embodiment of a half-circle-shaped light blocker in the 45-degree position.

FIGS. 4A and 4B illustrate another possible embodiment of light blocker 32. In this embodiment, the angular subtense of the light blocker element 34 is approximately 180 degrees.

As illustrated with reference to FIG. 4A and interpreting the darkened area as the light blocker element 34, the light blocker 32 is entirely uncovering only the COS+ 27B toroidal light sensor element, causing it to generate the maximum output signal. However, the light blocker 32 is covering by 50% the SIN− 26A and SIN+ 27A toroidal light sensor elements causing each of them to produce only around 50% output signal. And the light blocker 34 is completely covering the COS− 26B light sensor element, causing it to produce no output signal.

Figure 13:
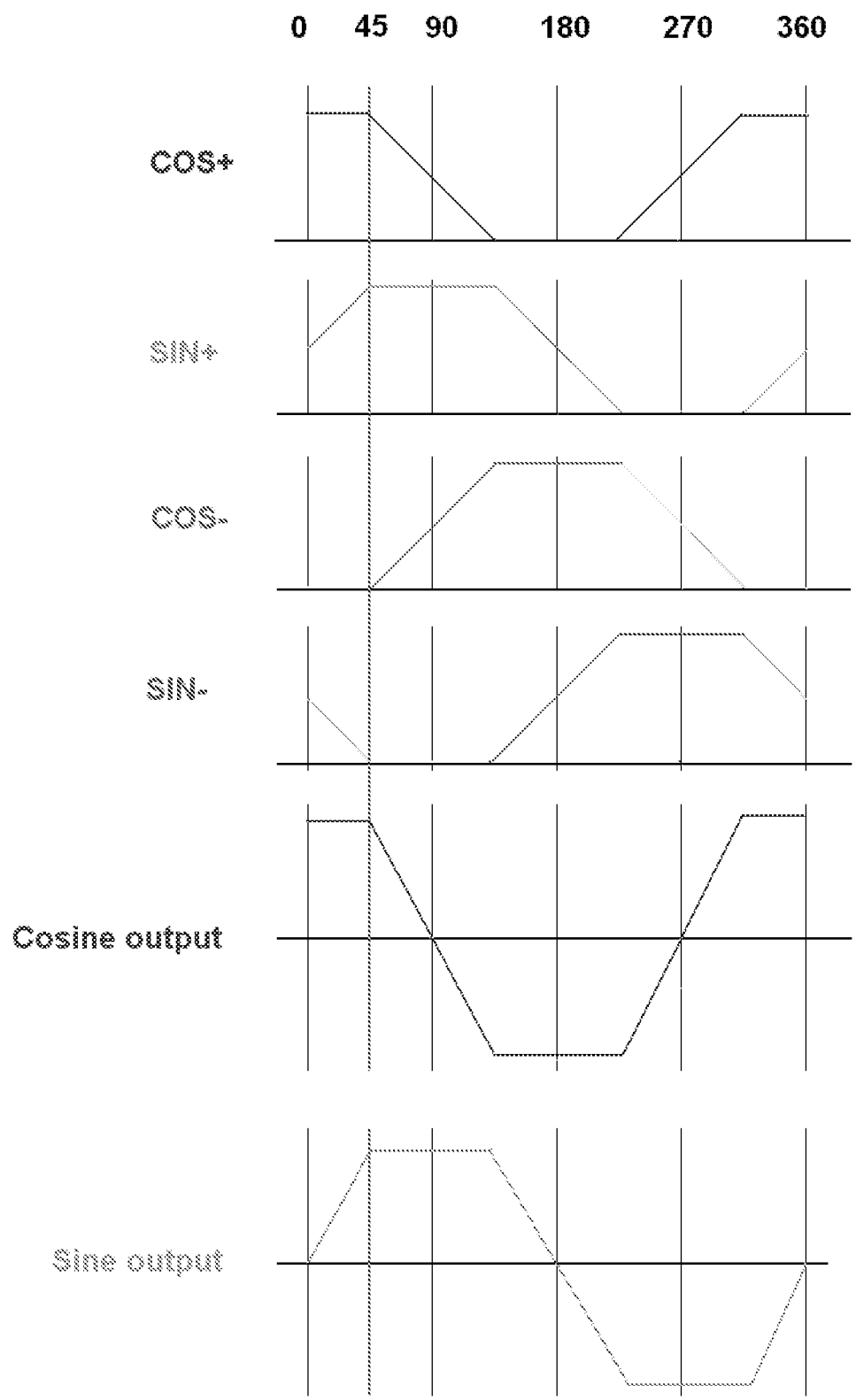
FIG. 13 illustrates the output of each of the COS+, SIN+, COS− and SIN− light sensors and combined Cosine and Sine outputs when light blockers are used that block light over an approximately 180-degree angle.

In the position shown in FIG. 4A, the output produced by each separate light sensor element 26A, 26B, 27A, 27B as well as the combined Sine and Cosine outputs will be equivalent to that shown at the 0-degree position of FIG. 13. Since both the SIN− 26A and SIN+ 27A light detector elements are partially uncovered and by the same amount, they are both receiving light from the light source 20, and will both produce an equal-but-opposite partial output signal. In this case the output signal from these light sensor elements 26A, 27A cancel each other out, and the circuit shown in FIGS. 9 and 10 will output zero volts at the Sine output. However, since the COS+ 27B light sensor element is completely uncovered (causing it to produce a maximum output signal), but the COS− 26B light sensor element is completely covered (causing it to produce no output signal), the circuit shown in FIGS. 9 and 10 will produce the maximum positive output at the Cosine output.

The drawing of FIG. 4B is similar to FIG. 4A, except that the light blocker 32 has been rotated by 45 degrees. In this position, the light emanating from the light source 20 will be allowed to fall unhindered on the SIN+ 27A and COS+ 27B light sensor elements, causing each of them to produce maximum output signal. But since the SIN− 26A and COS− 26B light sensor elements are now completely covered, these light sensor elements will not produce any signal output. In this position, the output will be equivalent to that shown at the 45-degree position of FIG. 13. Note that the Cosine output has remained at 100% while the Sine output has risen to 100% at this rotational position.

As with the embodiments shown in FIGS. 3A and 3B, as the light blocker 32 continues to rotate counter-clockwise, it will continue to periodically cover and uncover light sensor elements 26A, 26B, 27A, 27B and how the output signal from the light sensor elements changes over time, and may be combined into Sine and Cosine outputs, and ultimately decoded into an absolute angular position.

When the angular subtense of the light blocker element 34 is roughly equivalent to 180 degrees, an approximately flat-top-triangle-wave output signal is produced by each one of the light sensor elements, and also produced as the combined Sine and Cosine outputs.

Figure 8A:
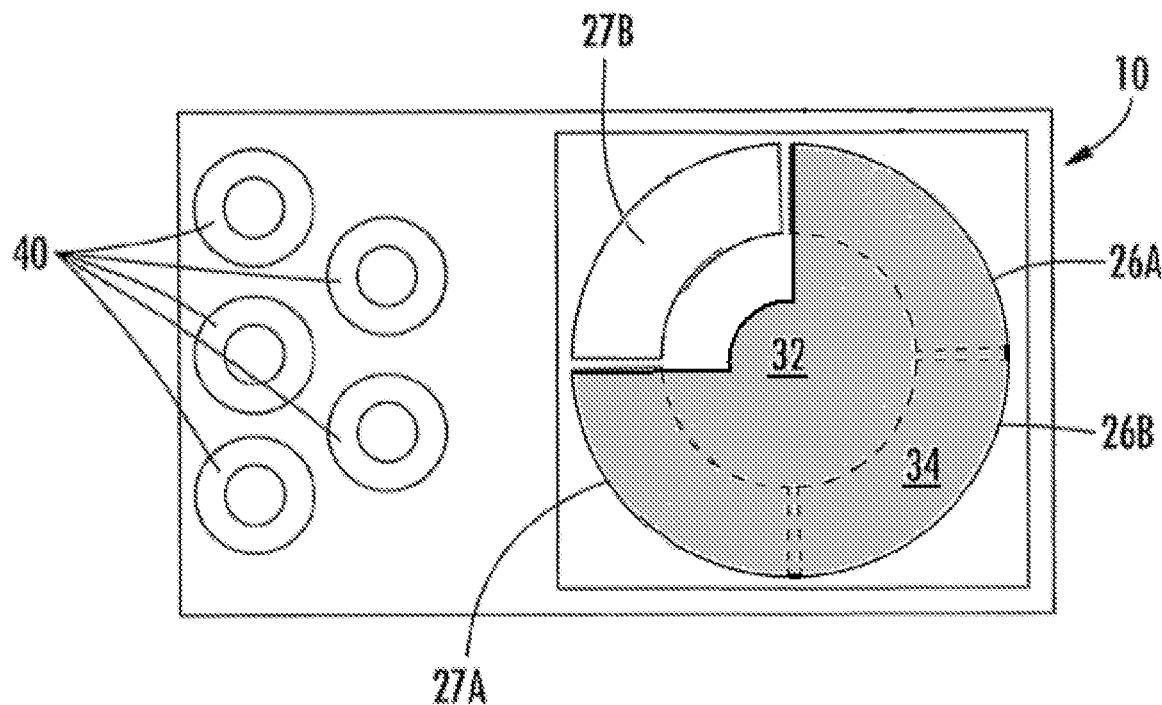
FIG. 8A is a top plan view of another embodiment of the position sensor of the current invention, including the circuit board, toroidal-shaped light sensors, and one possible embodiment of a three-quarter-circle-shaped light blocker in the 0-degree position.

Note that yet other angular subtenses are also possible for the light blocker element. FIG. 8A illustrates another possible embodiment of light blocker 32. In this embodiment, the angular subtense of the light blocker element 34 is approximately 270 degrees.

As illustrated with reference to FIG. 8A and interpreting the darkened area as the light blocker element 34, the light blocker 32 is entirely uncovering only the COS+ 27B toroidal light sensor element, causing it to generate the maximum output signal. However, the light blocker 32 is completely covering the SIN− 26A, SIN+ 27A, and COS− 26B toroidal light sensor elements, causing each of them to produce no output signal.

Figure 14:
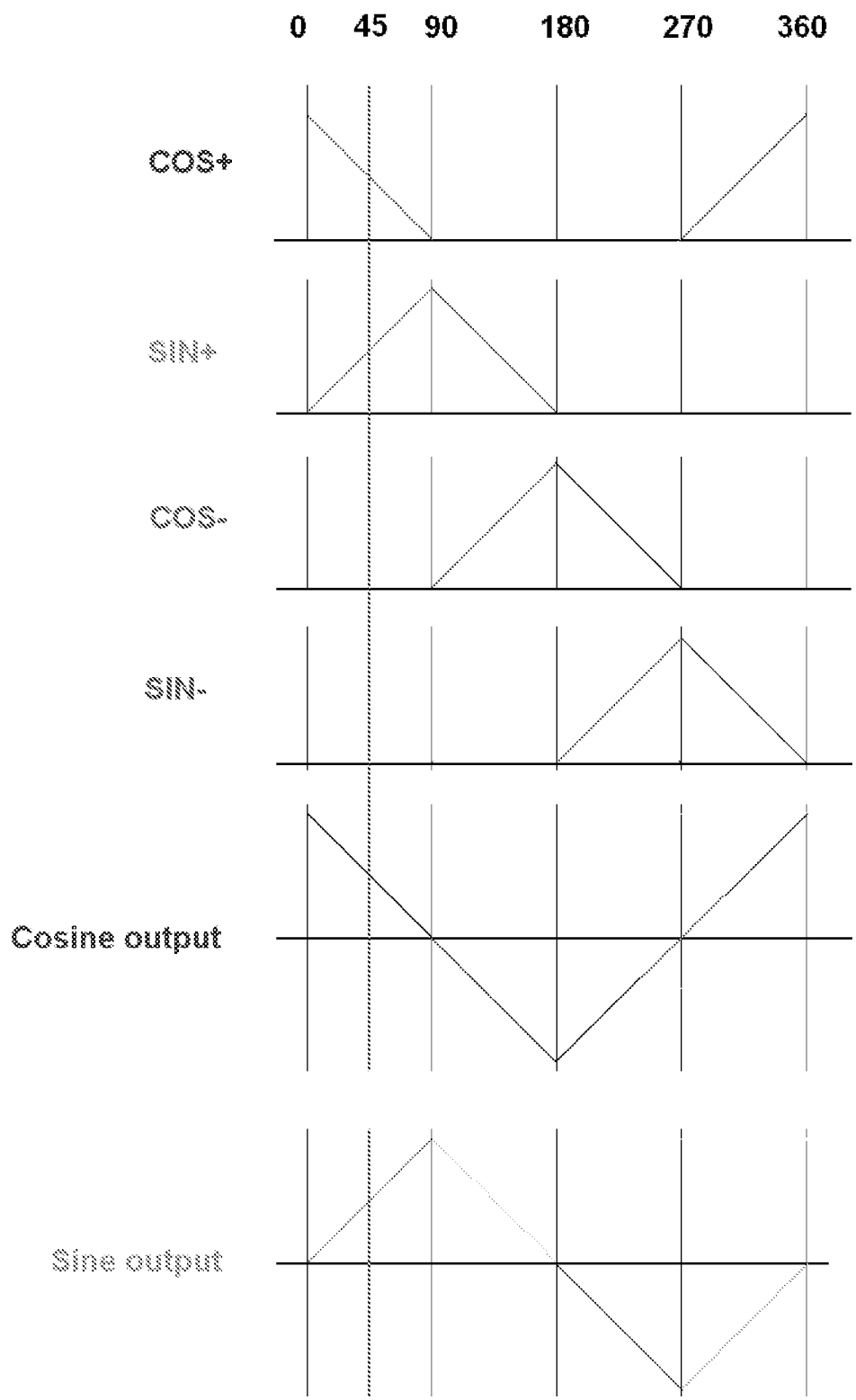
FIG. 14 illustrates the output of each of the COS+, SIN+, COS− and SIN− light sensors and combined Cosine and Sine outputs when light blockers are used that block light over an approximately 270-degree angle.

In the position shown in FIG. 8A, the output produced by each separate light sensor element 26A, 26B, 27A, 27B as well as the combined Sine and Cosine outputs will be equivalent to that shown at the 0-degree position of FIG. 14. Since both the SIN− 26A and SIN+ 27A light detector elements are completely covered, neither one is receiving light from the light source 20, and thus, neither one of them will produce any output signal. In this case the circuit shown in FIGS. 9 and 10 will output zero volts at the Sine output. However, since the COS+ 27B light sensor element is completely uncovered (causing it to produce a maximum output signal), but the COS− 26B light sensor element is completely covered (causing it to produce no output signal), the circuit shown in FIGS. 9 and 10 will produce the maximum positive output at the Cosine output.

As with the light blocker embodiments illustrated in FIGS. 3A, 3B, 4A and 4B, as the light blocker 32 continues to rotate counter-clockwise, it will continue to periodically cover and uncover light sensor elements 26A, 26B, 27A, 27B and how the output signal from the light sensor elements changes over time, and may be combined into Sine and Cosine outputs, and ultimately decoded into an absolute angular position.

When the angular subtense of the light blocker element 34 is roughly equivalent to 270 degrees, a pseudo triangle-wave output signal is produced by each one of the light sensor elements, and an approximately triangle-wave output produced as the combined Sine and Cosine outputs.

Figure 8B:
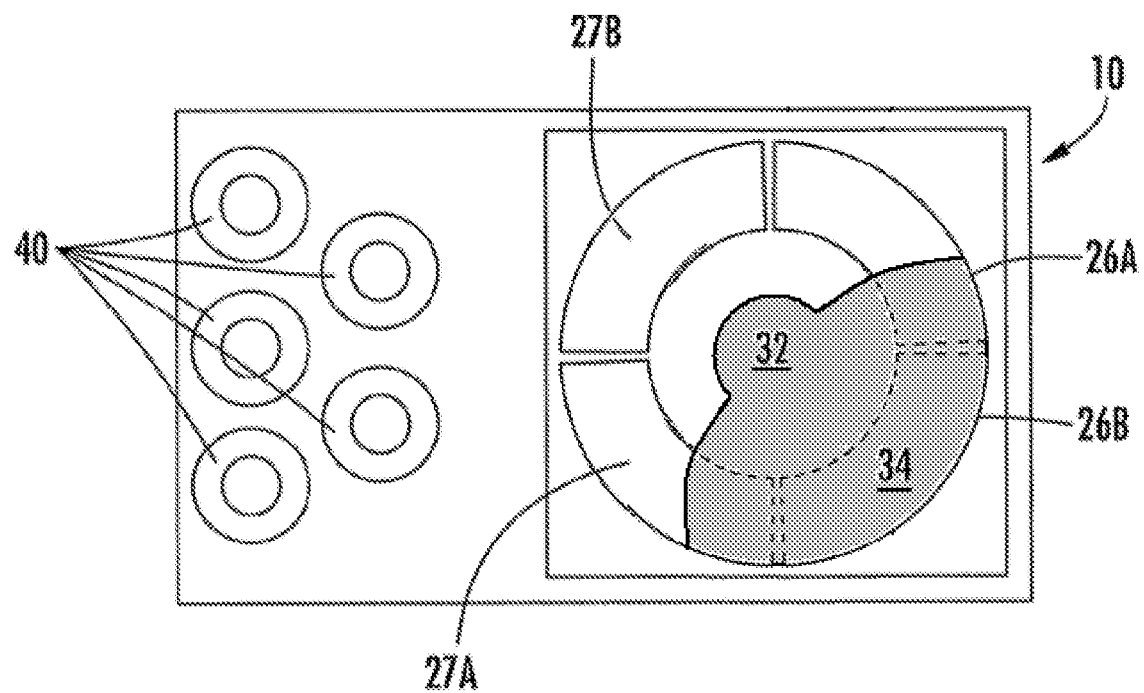
FIG. 8B is a top plan view of another embodiment of the position sensor of the current invention, including the circuit board, toroidal-shaped light sensors, and one possible embodiment of light blocker whose light blocker element is curved.

In addition to the light blocker and light blocker element shapes shown in FIGS. 3A, 3B, 4A, 4B and 8A, other shapes are also possible, such as the partially-curved shape shown in FIG. 8B. When the light blocker element 34 is curved, the output will become more or less sinusoidal.

The individual light sensor elements 26A, 26B, 27A, 27B can comprise a light sensor material or device that operates on the principle whereby an increase in light per unit area produces an increase in output signal. As a non-limiting example, silicon photodiodes, PIN photodiodes, avalanche photodiodes, and cadmium sulfide cells may be used as the light sensor elements in this invention. These are generically referred to as "photocells."

While it is known to arrange individual pairs of light sensor elements 26A, 26B, 27A, 27B on a single "photocell" die or chip 46A, 46B that is rectangular, as shown in FIG. 1, the individual light sensor elements may be assembled in any way as long as the output and shape constraints outlined above are met. Further, the light sensor elements 26A, 26B, 27A, 27B may have a greater area than shown, for example, may each comprise a chip of any shape.

As above described, the light blocker 32 prevents the light rays 22 emanating from the light source 20 from reaching portions of the light sensor elements 26A, 26B, 27A, 27B. The light blocker 32 comprising the pie-shaped element 34 is connected directly to the shaft 16, and the shaft is integrally formed with the motor 42, but alternate embodiments including shaft extensions or gear assemblies may be used without departing from the teachings of the present invention. Further, since the light blocker 32 only needs to prevent light from reaching the light sensor elements 26A, 26B, 27A, 27B, it can be made out of a variety of materials. For example, it can be made from ceramic, fiberglass/epoxy, sheet metal, glass, plastic, or any other suitable material that can block light. The light blocker 32 can be made using conventional manufacturing techniques such as injection molding, laser cutting, stamping, photo-etching, or standard machining techniques to conform to the shape herein described by way of example, or made from a transparent disk or transparent tube whereby the blocking function is performed by an opaque material being deposited onto the transparent disk or transparent tube. For light blockers 32 having an outer diameter of 0.35 inches and made with 0.008 inch thick aluminum, the inertia is less than 0.001 GM*CM$^2$, which is easily tolerated by small brushless motors.

Figure 5A:
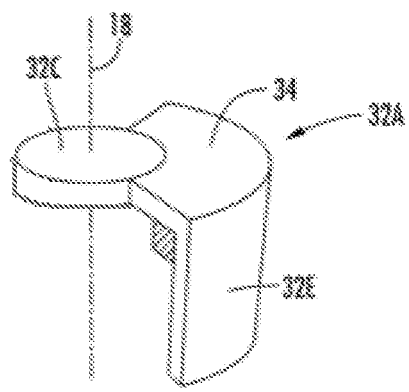
FIGS. 5A and 5B illustrate top/side and bottom perspective views, respectively, of an alternate embodiment of the light blocker that is cup-shaped.
Figure 5B:
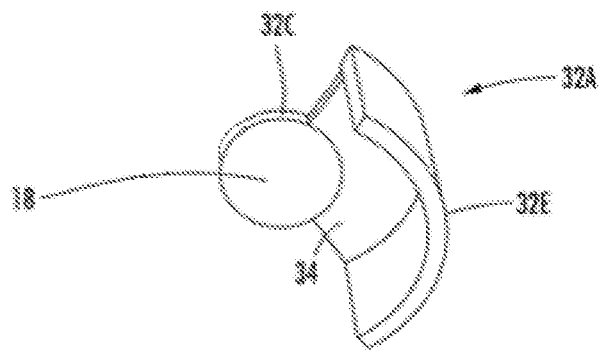
Figure 6:
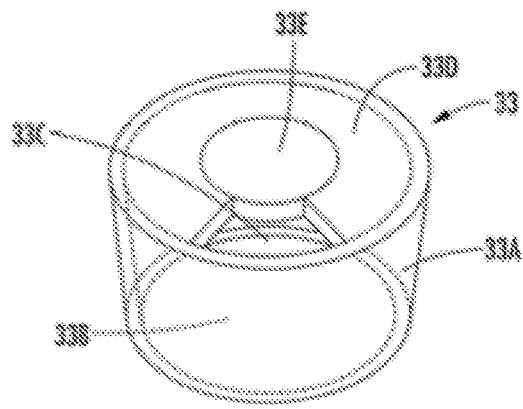
FIG. 6 illustrates a top/side perspective view of another embodiment of a light blocker that has a cutaway top face.

One embodiment of a light blocker 32A is depicted in FIGS. 5A and 5B, which comprises a central disk 32C having a curved portion 34 with a downwardly-depending wall 32E extending therefrom. As illustrated with reference to FIG. 6, a further embodiment of a light blocker 33 comprises a substantially cylindrical wall 33A an interior space 33B defined by the wall positioned to receive the light rays from the light source. The cylindrical shaped light blocker 33 includes an opening 33C through a top face 33D thereof and diametrically opposed about a central disk 33E. The opening 33C admits the light rays therethrough for reaching the light sensor elements.

Figure 7:
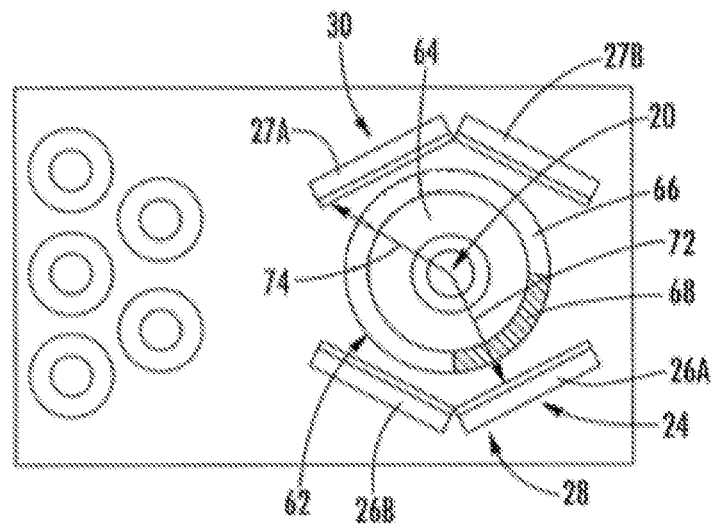
FIGS. 7 and 7A are partial top plan and perspective views, respectively, of a circuit board and rectangular light sensors of another embodiment of the current invention.
Figure 7A:
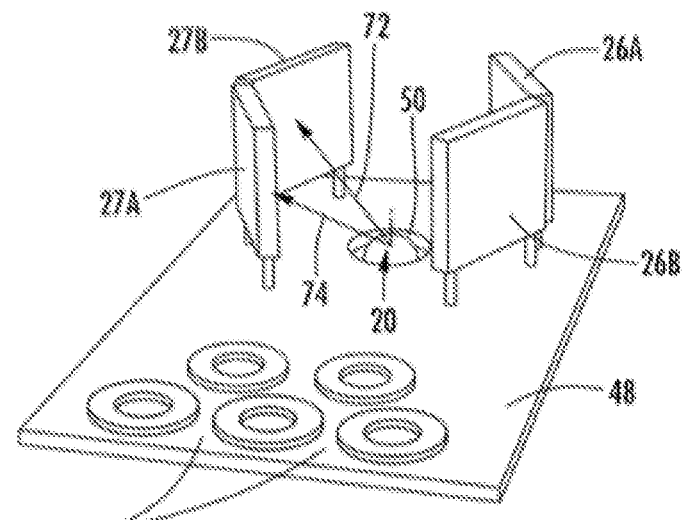

With reference again to FIG. 2, and now to FIGS. 7 and 7A, the detector 10A is also herein described in the context of its use within a motor, although this is not intended as a limitation. In the position detector 10A, the light detector 24, as above described, includes rectangular light sensor elements 26A, 26B, 27A, 27B that are arranged generally parallel to the axis 18 and thus rotating shaft 16. The light sensor elements 26A, 26B, 27A, 27B are mounted on the circuit board 48 and on the same side of the motor 42 as is the light source 20. The light blocker 32 is integrally formed with a bottom portion 16A of the shaft 16. The bottom portion 16A comprises a generally cylindrical portion 62 having an interior space 64 that is positioned to receive the light rays from the light source 20. The cylindrical portion 62 formed as an extension of the shaft 16 has a single opening 66, or "window," extending therethrough, for example, in this embodiment, from a bottom edge thereof, although this is not intended as a limitation. The opening 66 defines a section 68 of the cylindrical portion 62 that serves as the light blocker element. For the embodiment of the detector 10A, illustrated herein by way of example, the opening 66 has a height dimension 70, illustrated with reference again to FIG. 2, sufficient to admit the light rays therethrough for reaching the light sensor elements 26A, 26B, 27A, 27B. With a motor shaft 16 having a diameter of 3 mm, the light blocker 32 inertia can be less than 0.001 GM*CM$^2$, which is easily tolerated by small brushless motors.

Note that although the light blocker herein described with reference to FIG. 2 includes the bottom portion of the shaft, other light blockers may be used such as those described above with reference to FIGS. 5A, 5B, and 6. The light blocker may also be formed from a transparent tube or light guide with transparent and opaque areas performing the function of the opening 66 as the "window."

With continued reference to FIGS. 2 and 7, since the light sensor elements 26A, 26B, 27A, 27B are rectangular instead of circular, the distance 72 that the light rays 22 must travel to the center of a light sensor element, is different from the distance 74 that the light rays must travel to the edge of a light sensor element. This causes the output signal from each light sensor element 26A, 26B, 27A, 27B to be proportional to the tangent of the shaft rotation angle instead of being linearly proportional to the shaft rotation angle itself. However, since it is expected that the output of this position detector invention 10A will be conditioned further or linearized when needed, this nonlinearity is not a problem.

Embodiments of the light blocker described above improve the shadow that is cast on the respective light sensor elements, particularly if the light source is not a point source. Further, it is not strictly necessary for the alternative light blocker embodiments to have rectangular features. The cup may be made with cone-like features, which may provide easier manufacturing of the light blocker or better light blockage. Moreover, the light blocker itself may be embodied as a blade or even a spline that is machined directly onto a motor shaft itself to perform the light blocking function.

The operation of this embodiment of the position detector 10A works in exactly the same way as the other embodiment 10, insomuch that the light blocker 32 periodically blocks light rays 22 produced by the light source 20 from reaching one or more of the light sensor elements 26A, 26B, 27A, 27B. The angular subtense of the light blocker element 34 has the same affect in this embodiment 10A as it did in the other embodiment 10.

When the light blocker 32 is made of a material that substantially completely absorbs light, light is not permitted to pass through to the detectors. For this example, the light blocker can comprise black plastic, black-anodized metal, or a black coating deposited on a transparent disk or transparent tube. In this way, all light that is emitted from the light source is either reflected off of the specular reflective coating and then strikes the light detectors or is absorbed by portions of the light blocker.

With reference now to FIG. 9, when the light sensors are photodiodes, the COS− and COS+ sensor elements may be connected in anti-parallel, and then amplified by a single amplifier. Likewise the SIN− and SIN+ sensor elements may be connected in anti-parallel and then amplified by a separate single amplifier. This may be appropriate when the goal is to create a system that is the simplest, least costly and most compact, and also if the Sine and Cosine signals do not have to travel a long distance.

An alternative connection scheme is shown in FIG. 10. This connection scheme may be used whether the light sensors are photodiodes, cadmium sulfide cells, or other similar light sensors. With this connection scheme, the output of each individual light sensor 26A, 26B, 27A, 27B is amplified separately. The amplified signal from COS− and COS+ are combined through separate amplifier to deliver a final Cosine output from the invention. Likewise, the amplified signal from SIN− and SIN+ are combined through separate amplifier to deliver a final Sine output from the invention.

To derive the absolute angle of the position sensor invention, a division must be performed between the Sine and Cosine outputs to find the ratio of these signals, and then the Arctangent function is used to derive the absolute angle.

Figure 15:
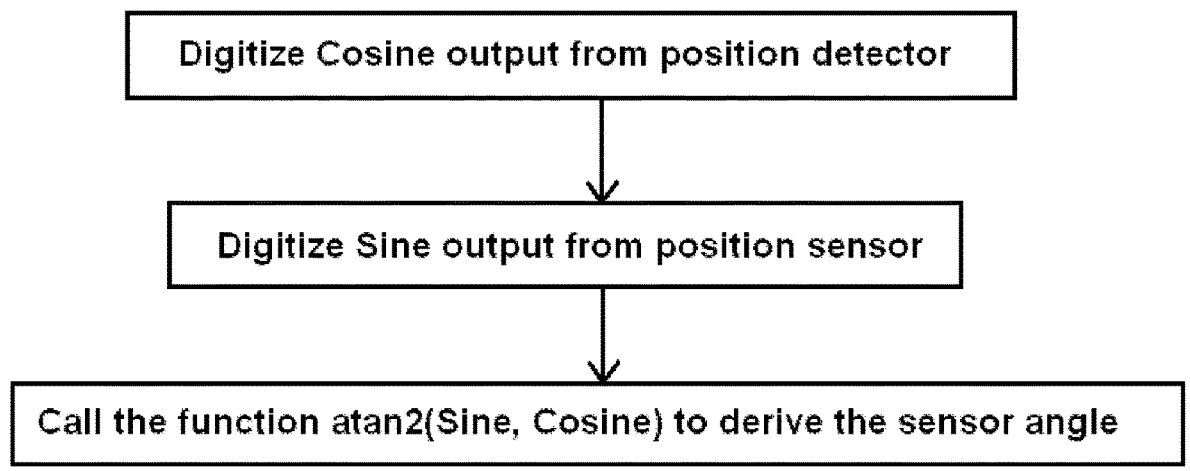
FIG. 15 shows the steps necessary to digitize the Sine and Cosine outputs and derive an absolute angle.
Figure 16:
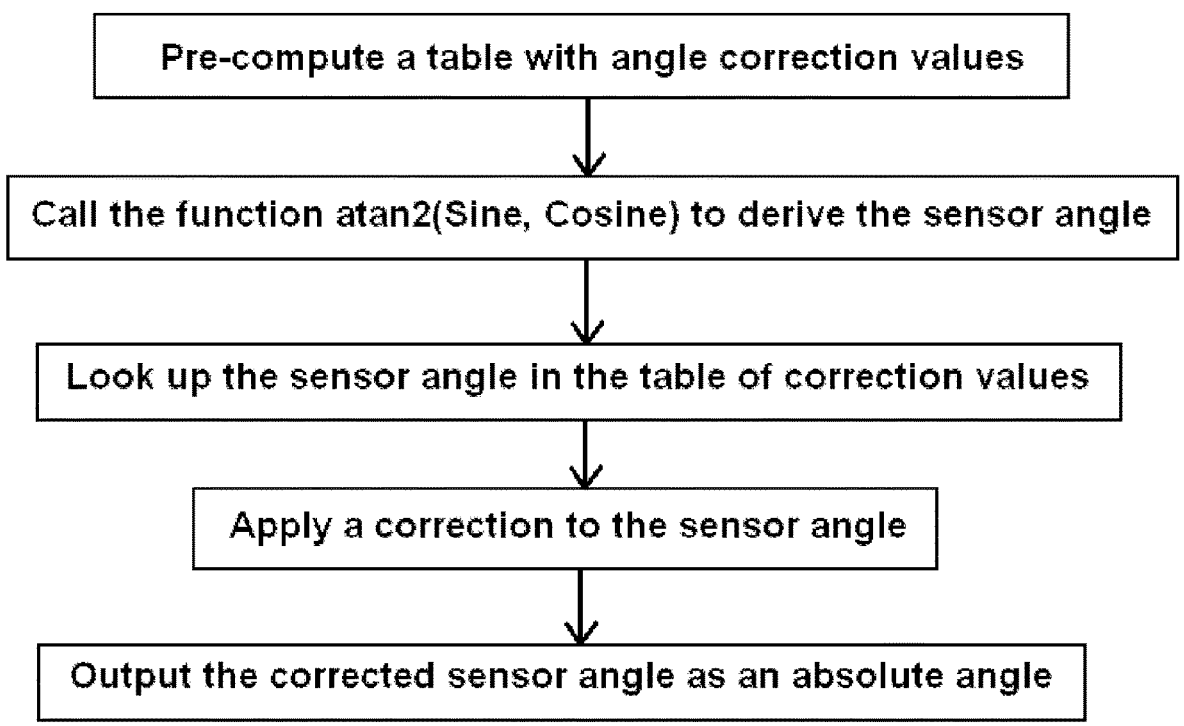
FIG. 16 shows the steps necessary to linearize the output by using a table.

The position detector of the present invention is particularly useful when connected to a digital servo system, which can digitize the Sine and Cosine outputs from the circuits shown in FIG. 9 and FIG. 10 and then perform the Arctangent function along with any linearization afterwards. FIG. 15 shows the steps necessary to digitize the Sine and Cosine outputs and derive an absolute angle. Thus, in one embodiment, the Sine and Cosine outputs are used to derive an absolute angle of rotation by (i) digitizing a Cosine output from a position detector; (ii) digitizing a Sine output from a position detector, and (iii) calling the function a tan 2(Sine, Cosine) to derive the sensor angle. Further, FIG. 16 shows the steps necessary to linearize the output by using a table. Thus, in one embodiment, the output from the sensors may be linearized by (i) pre-computing a table with angle correction values; (ii) calling the function a tan 2(Sine, Cosine) to derive a sensor angle; (iii) looking up a sensor angle in the table of correction values; (iv) applying a correction to the sensor angle; and (v) outputting a corrected sensor angle as an absolute angle.

Yet another embodiment of the present disclosure includes a method for determining a rotary position of a shaft, the method comprising (i) transmitting light into an inner space of a housing having a shaft extending therethrough and rotatable about an axis thereof; (ii) detecting at least a portion of the light with a light detector positioned within the inner space, the light detector comprising one "Cosine +" detector element, one "Cosine −" detector element, one "Sine +" detector element, and one "Sine −" detector element; (iii) digitizing a Cosine output generated by the "Cosine +" and "Cosine −" detector elements; (iv) digitizing a Sine output generated by the "Sine +" and Sine −" detector elements; and (v) calling a function a tan 2 (Sine, Cosine) to derive a sensor angle. In one embodiment, the method further comprises (vi) computing a table with angle correction values; (vii) comparing the sensor angle to an angle correction value in the table; (viii) applying a correction to the sensor angle; and (ix) outputting a corrected sensor angle as an absolute angle. The methods disclosed herein, including those depicted in FIGS. 15-16, may be used in connection with any of the disclosed embodiments of a rotary position detector and any variations thereof.

Position detectors have been manufactured, based on the teachings of this invention, that deliver absolute position accuracy having at least 16-bit resolution (65,536 steps per revolution) and while adding less than 0.001 GM*CM$^2$ inertia to the motor shaft. These position detectors are compact (0.5 inches diameter by 0.5 inches in axial length), and are manufactured easily and at low cost.

In the drawings and specification, there have been disclosed typical preferred embodiments of the invention, and although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

What is claimed is:

1. A rotary position detector comprising:
   a housing having an inner space;
   a shaft extending into the housing inner space, the shaft rotatable about an axis thereof;
   a light source positioned to emit light rays into the housing inner space;
   a light detector positioned within the housing inner space in a spaced relation to the light source, the light detector comprising four segmented light sensors about the axis and comprising one "Cosine +" detector element, one "Cosine −" detector element, one "Sine +" detector element, and one "Sine −" detector element;

a light blocker positioned between the light detector and the light source, the light blocker comprising an opaque element rotatable with the shaft; and a signal connection to the light detector for measuring an amount of light impinging on the segmented light sensors to thus measure an absolute rotary position of the shaft.

2. The rotary position detector according to claim 1, wherein the segmented light sensors are generally defined within a plane parallel to the axis.

3. The rotary position detector according to claim 1, wherein the segmented light sensors are generally defined within a plane perpendicular to the axis.

4. The rotary position detector according to claim 1, wherein each of the segmented light sensors comprise an arcuate sector shape.

5. The rotary position detector according to claim 4, wherein the arcuate shape comprises a substantially toroidal shape.

6. The rotary position detector according to claim 3, wherein the light sensors have a rectangular surface receiving the light.

7. The rotary position detector according to claim 1, wherein the radial extent of the light blocker elements is substantially less than the radial extent of the light sensors.

8. The rotary position detector according to claim 1, wherein the light source comprises a unitary light source generally aligned with the axis.

9. The rotary position detector according to claim 1, wherein the light sensors comprise a light sensor material responsive to light, and wherein an increase in light per unit area impinging thereon causes an increase in output signal.

10. The rotary position detector according to claim 1, wherein the light blocker element comprises a blade.

11. The rotary position detector according to claim 1, wherein the light blocker comprises a substantially transparent tube having imposed thereon the opaque elements.

12. The rotary position detector according to claim 1, wherein the light blocker comprises a bottom portion of the motor shaft, the bottom portion comprising a generally cylindrical portion having an interior space positioned to receive the light rays from the light source, the light blocker element comprising a segment of the cylindrical portion separated by a spaced-apart opening extending from a bottom edge thereof.

13. The rotary position detector according to claim 1, further comprising a motor, wherein the motor is operable with the shaft.

14. The rotary position detector according to claim 1, wherein the "Cosine +" detector element and the "Cosine −" detector element are connected in anti-parallel.

15. The rotary position detector according to claim 14, further comprising an amplifier configured for amplifying a signal provided by the "Cosine +" and the "Cosine −" detector elements.

16. The rotary position detector according to claim 1, wherein the "Sine +" detector element and the "Sine −" detector element are connected in anti-parallel.

17. The rotary position detector according to claim 16, further comprising an amplifier configured for amplifying a signal provided by the "Sine +" and "Sine −" detector elements.

18. The rotary position detector according to claim 1, wherein the "Cosine +" detector element and the "Cosine −" detector element are connected in anti-parallel, and further comprising a first amplifier configured for amplifying a signal produced by the "Cosine +" detector element, a second amplifier configured for amplifying a signal produced by the "Cosine −" detector element, and a third amplifier configured for amplifying a combined signal produced by the first and second amplifiers.

19. The rotary position detector according to claim 1, wherein the "Sine +" detector element and the "Sine −" detector element are connected in anti-parallel, and further comprising a fourth amplifier configured for amplifying a signal produced by the "Sine +" detector element, a fifth amplifier configured for amplifying a signal produced by the "Sine −" detector element, and a sixth amplifier configured for amplifying a combined signal produced by the fourth and fifth amplifiers.

20. A method for determining a rotary position of a shaft, the method comprising:

transmitting light into an inner space of a housing having a shaft extending therethrough and rotatable about an axis thereof;

detecting at least a portion of the light with a light detector positioned within the inner space, the light detector comprising one "Cosine +" detector element, one "Cosine −" detector element, one "Sine +" detector element, and one "Sine −" detector element;

digitizing a Cosine output generated by the "Cosine +" and "Cosine −" detector elements;

digitizing a Sine output generated by the "Sine +" and Sine −" detector elements; and calling a function a tan 2 (Sine, Cosine) to derive a sensor angle.

21. The method of claim 20, further comprising:
computing a table with angle correction values;
comparing the sensor angle to an angle correction value in the table;
applying a correction to the sensor angle; and
outputting a corrected sensor angle as an absolute angle.

* * * * *